Nov. 9, 1943.  E. W. FULLER  2,333,854
WINDSHIELD CLEANING MECHANISM
Filed July 5, 1941   2 Sheets-Sheet 1
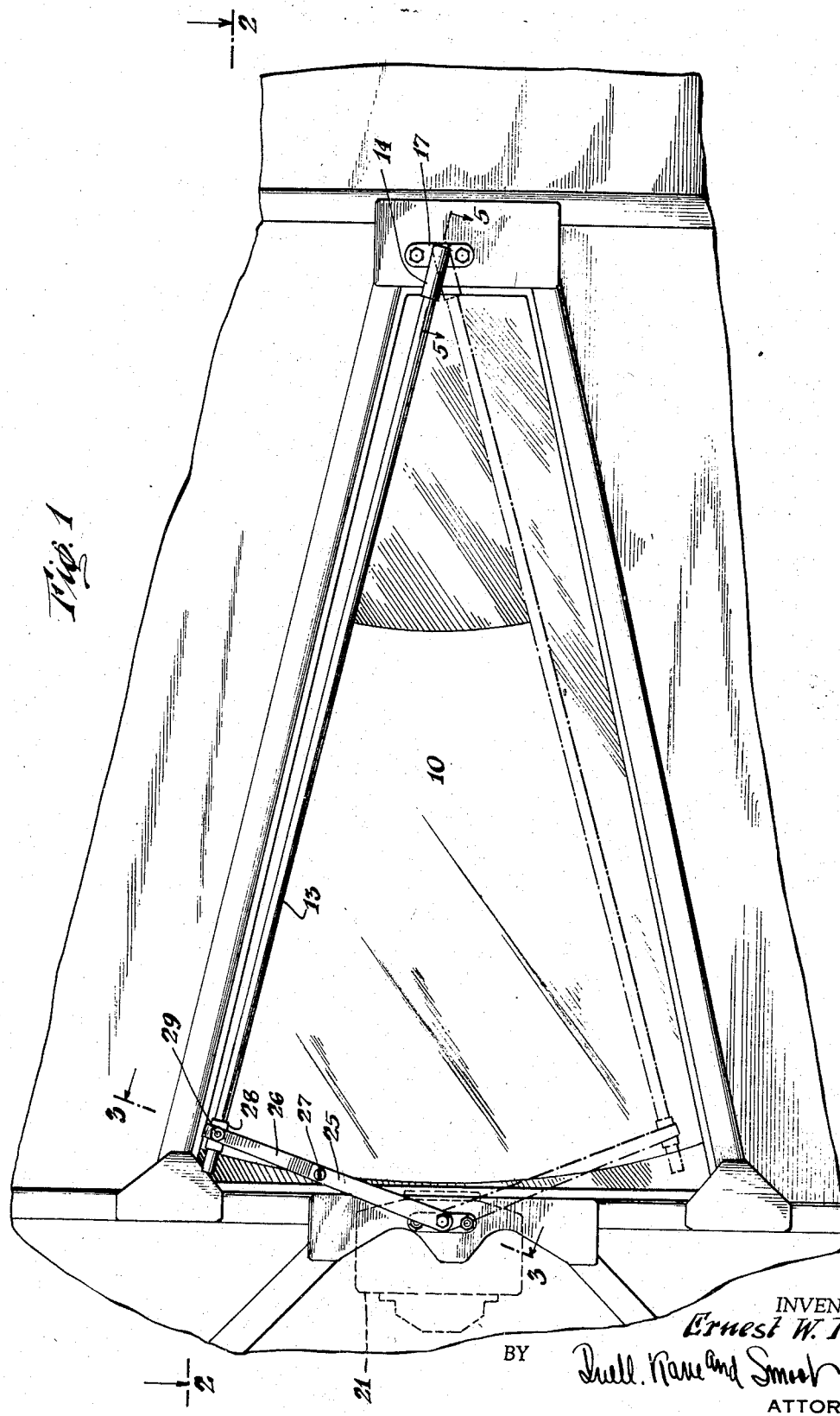
INVENTOR.
Ernest W. Fuller
BY
ATTORNEYS

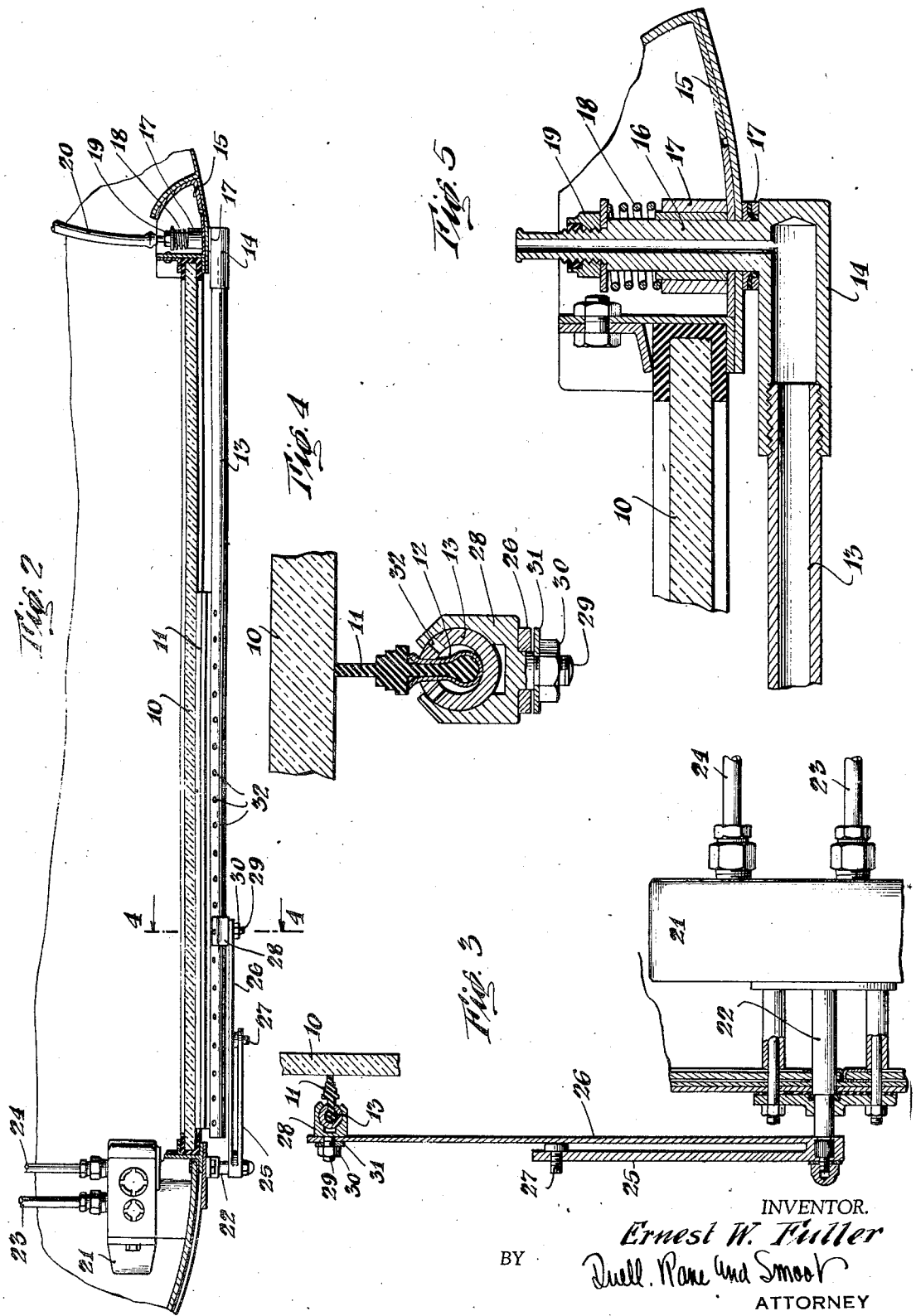

Patented Nov. 9, 1943

2,333,854

UNITED STATES PATENT OFFICE 2,333,854

WINDSHIELD CLEANING MECHANISM

Ernest W. Fuller, Shaker Heights, Ohio, assignor to The Aerotorque Company, Cleveland, Ohio, a corporation of Connecticut Application July 5, 1941, Serial No. 401,117

12 Claims. (Cl. 15—250.4)

This invention relates to a structurally and functionally improved mechanism particularly intended for cleaning windshields and similar transparent panels. In its more specific aspects, the present invention contemplates an assembly of this character which will be of particular utility when employed in connection with aircraft.

It is an object of the invention to furnish an extremely rugged type of mechanism which may readily be applied to aircraft and when so applied will function efficiently and even under the most adverse operating conditions to maintain a surface free from accumulations of foreign materials such as, snow and sleet.

Additionally, it is an object of the invention to provide a windshield wiper mechanism which will be free from complicated and failure-provoking controls and which will moreover be of very simple design and rugged construction.

A further object is that of furnishing a mechanism of this type, in which a maximum application of motive power will be transmitted to the wiper structure and so that the latter may be applied to the bombardier's window or other relatively large panel of a plane with no impairment to its function.

Another object is that of providing a mechanism of this character of which, when not in use, will occupy a position such, that it will not obscure the field of vision through the panel; it being moreover a function of the present apparatus that a liquid distributing mechanism may form a part thereof and operate in a manner such, that accumulations of material will be prevented from forming not alone on the face of the transparent panel, but also on the exposed portions of the mechanism.

An additional object is that of providing in a mechanism of this type, an adjustment provision such, that the wiper blade or its equivalent may be caused to assume precisely a predetermined and desired position with reference to a surface to be cleaned and so that, it may cooperate with said surface with maximum efficiency.

With these and other objects in mind, reference is had to the attached sheets of drawings illustrating one practical embodiment of the invention, and in which:

Fig. 1 is a plan view of the apparatus in applied position upon an airplane;

Fig. 2 is a longitudinal sectional view taken along the lines 2—2 and in the direction of the arrows as indicated in Fig. 1;

Fig. 3 is a transverse sectional view taken along the lines 3—3 and in the direction of the arrows as also indicated in Fig. 1;

Fig. 4 is an enlarged transverse sectional view taken along the lines 4—4 and in the direction of the arrows as indicated in Fig. 2; and Fig. 5 is a fragmentary and enlarged view of a portion of the apparatus.

In these views, the reference numeral 10 indicates a transparent panel which is to be maintained free from vision-obscuring accumulations. As shown, this panel is in the form of a bombardier's window, but it is obvious that the mechanism might be employed in conjunction with various other surfaces to be cleaned. The cleaning element itself is preferably in the form of a squeegee or blade 11 conveniently formed of rubber and to traverse the panel. This squeegee has associated with it, a backing strip 12 which may in turn be partially enclosed within a tube 13 slotted to accommodate the same.

As shown especially in Fig. 5, the end of the tube may extend in the form of, or be coupled to a hollow L shaped fitting 14. One leg 16 of this fitting may project through an opening in the skin 15 of the ship and be connected to a tube 20 for a purpose hereinafter brought out. Packing gaskets 17 or similar elements may be provided at this point to prevent the entrance of air through the opening accommodating the extension. In order to assure the effectiveness of this packing and to permit adjustment of tube 13 away from and towards panel 10, a spring 18 may bear against the portion of this assembly and be acted upon by a clamping nut 19 which may be conveniently adjusted in order to vary the tension of the spring 18. Therefore, it is obvious that the desired adjustment and tightness are achieved. In this manner, one end of the tube 13 and accordingly the wiping element 11 and its associated parts are pivotally supported. At this time, it is to be noted, that such pivotal support—as shown especially in Fig. 1—is preferably off center with respect to the panel 10. As a consequence it is feasible, with the apparatus inoperative, to have the tube and wiping element lie immediately adjacent and parallel to one edge of the panel 10. Accordingly, vision will be obscured to only a minimum extent.

Adjacent that end of the panel opposite to the fitting 14, a motor 21 is positioned. This motor may be of any desired type but should have extending from it, a shaft 22 which is preferably oscillated as the motor parts operate. If the motor be of the fluid pressure type, then tubes 23 and 24 may be secured to it and extend from the source of pressure supply ordinarily available in an airplane as well as the fluid reservoir which feeds or forms a part of such fluid system. Secured to shaft 22 is a relatively short arm which connects the same with the wiper element 11. This arm is preferably formed of resilient or spring metal and may be slotted to provide in effect, a pair of arm portions 25 and 26. The first of these is relatively thick and consequently rigid and terminates at a point short of the wiper element. The second of the same is relatively resilient and aside from the connection established by the integral or equivalent portion of this arm adjacent the shaft 22, a tension screw 27 may be mounted by arm 25 and bear against arm 26.

Secured adjacent the outer end of arms 26 and coupling the same with the wiper element is a slide member 28. The connection between this member and arm 26 may be established in any desired manner but should permit of a free rotation of the member 28 with respect to the arm. Conveniently, this may be accomplished by having a bolt portion 29 form a part of member 28 and which portion extends through an opening in the arm and is secured thereto by a nut 30; a washer 31 being conveniently interposed between this nut and the body of the arm.

It is apparent with a set-up of apparatus as herein provided and with the motor 21 operating, the shaft 22 will be oscillated to correspondingly swing the arm 26. Incident to such swinging movement, the slide member 28 will reciprocate along tube 13 or its equivalent. As a consequence of such reciprocation, the wiping element 11 will pivot around the point defined by the leg 16. If it is found that the wiper element 11 is not properly traversing the panel 10, then by adjusting the tension on the spring 18, the inner end of the tube 13 may be brought to a position in greater proximity to the surface of the panel 10. Also, the screw 27 or its equivalent may be adjusted to bear with greater intimacy against the surface of arm 26, in order to flex the latter towards the panel 10. This again will have the result of causing the wiper element to be shifted towards the surface of the panel. In such flexion of arm 26, it will be apparent that arm 25 will not be correspondingly flexed in view of its relatively great rigidity.

Thus, the position of the wiper element may be precisely established with reference to the panel and the shaft 22 in oscillating will cause the wiper element to efficiently cooperate with the surface to be cleaned in order to remove therefrom any vision-obscuring material. In an aircraft installation, such material would ordinarily comprise ice, snow and similar accumulations. It is for the purpose of clearing this material with minimum effort and expenditure of time that the extension 16 is formed with a bore and that the tube 13 is preferably employed. By means of the passages thus furnished, alcohol or similar liquid may flow through the tube and be under any desired degree of pressure. The tube is formed with a series of openings 32 extending towards the surface to be cleaned. Accordingly, a spray of liquid will be directed towards the surface and directly in the path of movement of the wiper element 11. As a consequence, material which has accumulated on the panel prior to operation of the wiper element will be caused to rapidly disintegrate and the formation of further accumulations will be precluded so long as the wiper element traverses the cleaned surface and some amount of alcohol or other liquid is directed towards the face of panel.

This construction has the further important advantage that the slide member 28 will not become clogged by accumulations of foreign material which may have been deposited on the tube and member. In other words, the liquid flowing through the openings 32 will serve to disintegrate and also prevent the formation of any accumulations on the parts which are to have relative movements with respect to each other.

It will be obvious as a consequence of this structure, that it is unnecessary to employ any connecting mechanism between the motor and the blade or wiper structure other than the arm and the tube of other mechanism directly associated with the blade or its equivalent. Moreover, by having the wiper blade pivoted adjacent one of its ends and the power applied adjacent the opposite end, but a minimum amount of force will be necessary to cause the blade to effectively traverse the surface to be cleaned. Also, by introducing the alcohol or anti-freeze liquid at a point relatively remote from the motor, it is unnecessary to complicate the structure of the latter or any mechanism directly associated therewith, in order to provide a passage or path for the flow of fluid.

As will be observed, the wiper element may readily be adjusted towards and away from the surface to be cleaned and this adjustment may be effected in a manner calculated to secure just the proper intimacy of contact between the blade and panel surface which is desirable to effect a maximum efficiency of operation. By dispensing the alcohol or other liquid through the blade-mounting tube, such liquid is distributed directly to the panel surface without the intermediary of any complicated structure which is liable to become disconnected or to otherwise distribute the liquid inefficiently. Finally, it will be observed, that as afore brought out, the blade being mounted off-center, it is feasible to bring the same to a "parked" position of which it lies immediately adjacent the side edge of the panel and as a consequence, does not obscure vision through the latter.

From the foregoing, it will be appreciated that among others, the several objects of the invention as specifically aforenoted are achieved. Obviously, numerous changes in construction and re-arrangement of the parts might be resorted to without departing from the spirit of the invention as defined by the claims.

I claim:

1. A windshield wiper mechanism including in combination, a wiper mounting member, means for swingingly supporting one end of said member whereby its opposite end may have swinging movement, a rotatable shaft adjacent such latter end and located at a point substantially midway between the limits of such movement and a connecting element secured to said shaft and having sliding connection with said member whereby to swing the same.

2. A windshield wiper mechanism including in combination, a wiper mounting member, means for supporting said member whereby one of its ends may have swinging movement, a rotatable shaft adjacent such end, a connecting element secured to said shaft and having sliding connection with said member whereby to swing the same, said member being hollow and formed with a plurality of openings so arranged that liquid may be distributed from the interior of said member beyond the same and a certain amount of said liquid may act to lubricate the element and member.

3. A windshield wiper mechanism including in combination, a wiper mounting member, means for rotatably supporting said member whereby one of its ends may have swinging movement, a rotatable shaft adjacent such latter end, a connecting element secured to said shaft and having sliding connection with said member whereby to swing the same and means whereby said member may be shifted in a direction substantially transverse to the direction of its swinging movement.

4. A windshield wiper mechanism including in combination, a wiper mounting member, means for swingingly supporting one end of said member whereby its opposite end may have swinging movements, a rotatable shaft adjacent such latter end, a connecting element secured to said shaft and having sliding connection with said member whereby to swing the same and means forming a part of said element for shifting said member in a direction substantially at right angles with respect to the direction of its swinging movements.

5. A windshield wiper mechanism including in combination, a wiper mounting member, means for pivotally supporting said member adjacent one of its ends, a rotatable shaft adjacent its opposite end, a connecting element having one of its ends connected to said shaft, its opposite end being slidably connected with said member, means associated with the pivotal support of said member whereby the latter may be adjusted in directions substantially at right angles with respect to the swinging movement of said member and means forming a part of said connecting element and whereby said member may be shifting adjacent its outer end in directions substantially towards and away from a surface to be cleaned.

6. A windshield wiper mechanism including in combination, a wiper mounting member, means for pivotally supporting said member adjacent one of its ends, a rotatable shaft adjacent its opposite end, a connecting element having one of its ends connected to said shaft, its opposite end being slidably connected with and traversing said member, said member being formed with a bore and with openings extending from said bore in directions towards the surface to be cleaned, the latter end of said connecting element being adapted to move along a path adjacent certain of said openings and whereby the sliding connection between said element and member will be lubricated by fluid flowing from said openings and means providing a passage as a part of said pivotal connection and communicating with said bore for the distribution of liquid therethrough.

7. A windshield wiper mechanism including in combination, a wiper mounting member, means for pivotally supporting said member adjacent one of its ends and beyond a surface to be cleaned by a wiper mounted by said member; said surface having a center point, a rotatable shaft adjacent the opposite end of the member, a connecting element having one of its ends connected to said shaft, its opposite end being slidably connected with said member and said pivotal connection being adapted to be disposed to one side of the center point of such surface and whereby with said connecting element in a predetermined position, said member may lie in a condition of rest adjacent the edge of such surface and to one side of the field of vision through the same.

8. A windshield wiper mechanism including in combination, a member to traverse a surface to be cleaned, means for pivotally supporting said member adjacent one of its ends, an oscillating shaft adjacent the opposite end of said member, a resilient arm secured to said shaft and means carried by said arm and having sliding contact with said member to cause a swinging of the same in response to oscillation of said shaft; the resiliency of said arm urging the member towards the surface to be cleaned.

9. A windshield wiper mechanism including in combination, a member to traverse a surface to be cleaned, means for pivotally supporting said member adjacent one of its ends, an oscillating shaft adjacent the opposite end of said member, an arm secured to said shaft, means carried by said arm and having sliding contact with said member to cause a swinging of the same in response to oscillation of said shaft, said member presenting in cross-section a tube formed with a slit, a wiper blade extending through said slit and to contact a surface to be cleaned and said tube being formed with perforations to one side of said slit and blade and through which liquid may be distributed from the interior of said tube in the direction of the surface to be cleaned; the means carried by said arm traversing the latter in the path of flow of liquid from said perforations.

10. A windshield cleaning mechanism including in combination a blade-carrying member, means providing a fixed pivot supporting one of the ends of said member, and whereby the opposite end of said member may swingingly traverse the surface of a panel to be cleaned, a power driven shaft adjacent such opposite end of the member, an arm having one of its ends secured to said shaft, means for slidably connecting the opposite end of said arm to said member, adjacent such opposite end of the latter, and said arm being of a length substantially less than that of said member.

11. A windshield wiper mechanism for application to a panel to be cleaned, said mechanism including in combination a blade-mounting member to move from one extreme position across the panel to another extreme position thereon, mounting means to be disposed adjacent one end of said panel for swingingly supporting one end of said member, a power-driven shaft to be disposed adjacent the opposite end of said panel and in line with the opposite end of the member when the latter is substantially midway between its extreme positions, an arm shorter than said member, one of the ends of said arm being secured to said shaft, and means for slidably coupling the opposite arm end to said member.

12. In a window wiper mechanism, an elongated window wiper member, means swingably supporting one end of the member so that the member can move laterally of itself across a surface to be cleared, a rotary power shaft adjacent the opposite end of said member, an arm coupled with the shaft at one end of the arm, means slidably and drivingly connecting the opposite end of the arm with said wiper member, said shaft and first mentioned means being so related to the field of operation of the wiper member that the principal axis of the arm lies substantially parallel to the wiper member when the latter is approximately midway between the lateral limits of said field.

ERNEST W. FULLER.